2,882,326

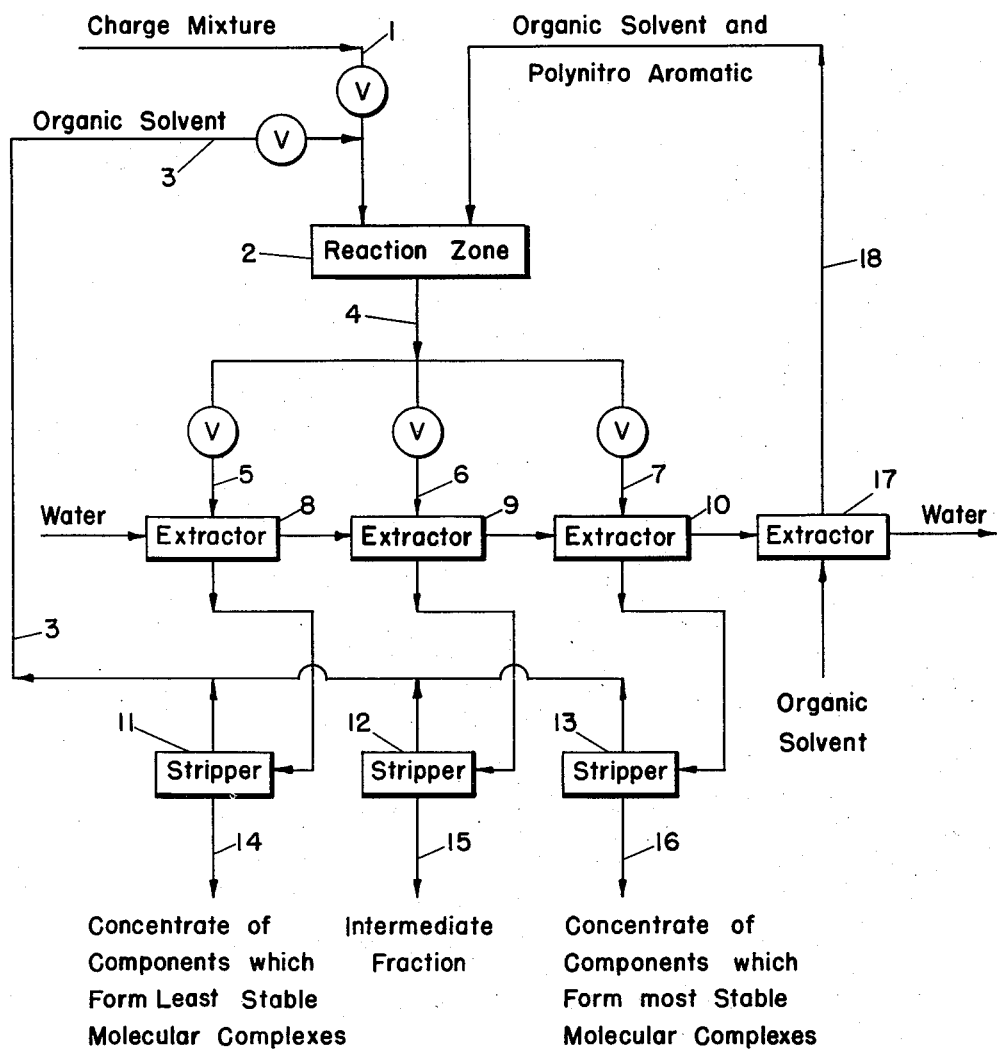

SEPARATION OF ORGANIC COMPOUNDS USING SOLID ADSORBENTS CONTAINING ADSORBED POLYNITRO AROMATIC COMPOUNDS

James L. Jezl, Swarthmore, Pa., assignor to Sun Oil Company, Philadelphia, Pa., a corporation of New Jersey Application June 17, 1955, Serial No. 516,118

8 Claims. (Cl. 260—674)

This invention relates to the separation of organic mixtures containing components which react with polynitro aromatic compounds to form molecular complexes having different degrees of stability.

According to the invention, a mixture of organic compounds is contacted in a reaction zone with a solid adsorbent containing an adsorbed polynitro aromatic compound. During this contact, the adsorbed polynitro aromatic reacts with components of the charge mixture to form molecular complexes. Certain components of the charge mixture form more stable complexes than do other charge components. With the further addition of charge material or more preferably with the addition of a lower boiling organic solvent, charge components are selectively decomplexed and removed from the reaction zone. An effluent fraction containing components of the charge mixture which form relatively less stable molecular complexes with the polynitro aromatic compound is collected. Subsequently, at least one later effluent fraction containing charge mixture components which form relatively more stable molecular complexes with the polynitro aromatic compound is collected.

The present invention is useful for separating mixtures of any organic compounds which form molecular complexes of different stability with polynitro aromatic compounds. Mixtures of aromatic hydrocarbons can be separated according to the present invention. In general, aromatics having a greater number of condensed rings per molecule form molecular complexes of greater stability with polynitro aromatic compounds. These aromatic compounds can be separated from aromatics having fewer nuclear rings per molecule or from other hydrocarbons, such as paraffins or naphthenes which form less stable molecular complexes. For example, mixtures comprising naphthalene and biphenyl can be separated by this invention. Napthalene forms a more stable molecular complex than does biphenyl. In like manner, anthracene can be separated from naphthalene; in this case anthracene forms the more stable molecular complex. Mixtures comprising more than two components can be separated. For example, a mixture comprising naphthalene, biphenyl, and saturate hydrocarbons can be separated into a saturate hydrocarbon concentrate, a biphenyl concentrate, and a naphthalene concentrate by the invention.

Polynuclear organic sulfur compounds, e.g. condensed ring thiophenes, react with polynitro aromatic compounds to form stable molecular complexes. Thus these sulfur compounds can also be treated by this invention. Generally, the sulfur compounds form more stable complexes than do hydrocarbons, and accordingly the sulfur compounds can be separated from hydrocarbons by the invention. For example, an organic mixture containing thiophenes, anthracene, and naphthalene can be resolved into a thiophene concentrate, an anthracene concentrate, and a naphthalene concentrate; the thiophenes form the most stable and naphthalene the least stable molecular complex with the polynitro aromatic in this mixture.

As described above, the organic mixture which is to be separated is contacted with a solid adsorbent containing an adsorbed polynitro aromatic compound. The adsorbent can be substantially any of the commercially available solid inorganic adsorbents. Examples of these adsorbents are silica gel, activated charcoal, fuller's earth, bauxite, acid activated clay, and the like.

The polynitro aromatic compound used is preferably a trinitro aromatic although aromatics containing a greater or lesser number of nitro groups can also be used. Examples of preferred polynitro aromatics for use in this invention are: trinitro benzenes, trinitro phenols such as picric acid, trinitro toluenes, trinitrofluorenones, and similar compounds.

The organic materials which are to be separated, after reactive contact with the adsorbed polynitro compound, are selectively decomplexed and removed from the reaction zone by contact with an organic solvent. This organic solvent need not react with the polynitro compound to form more stable complexes than those formed by the charge components in order to be effective as a decomplexing agent. In fact, it is preferred that this solvent does not readily form stable complexes, since a better fractionation of the charge components results through use of these decomplexing solvents. If desired, an additional portion of the charge mixture can be used as the decomplexing solvent. However, use of a hydrocarbon having substantially different boiling range from that of the charge is preferably used. Low boiling saturate hydrocarbons such as pentane, hexane, and the like can be used. Mixtures of hydrocarbons such as petroleum ether can be used. Mononuclear aromatics such as benzene can be used alone or more preferably in admixture with low boiling saturates as the decomplexing solvent.

This invention will be further described in connection with the accompanying drawing which illustrates diagrammatically an embodiment of the invention.

Referring now to the accompanying drawing, the organic charged mixture to be separated is introduced by means of line 1 into reaction zone 2. In reaction zone 2, the charge mixture is contacted with solid adsorbent material such as silica gel having a polynitro aromatic compound, e.g. picric acid, adsorbed thereon. Reaction zone 2 can be any suitable apparatus known in the art for effecting a reactive contact between a liquid or a solid. For example, the reaction zone can comprise one or more columns packed with the solid contact material connected in series or in parallel to permit continuous, cyclic type operation. Alternatively, moving bed liquid-solid contact techniques known in the art can be employed.

In reaction zone 2, components of the charge mixture react with the adsorbed polynitro aromatic compound to form molecular complexes of varying stability. In preferred practice, the charge mixture to reaction zone 2 is diluted with low boiling organic solvent which is also subsequently used as the decomplexing solvent. This organic solvent has a boiling range substantially different from that of the charge and does not readily form molecular complexes with the adsorbed polynitro compound. The solvent diluent is introduced through line 3. Use of the solvent or diluent improves the separation obtainable by the present process. Suitable compounds for use as the organic solvent are low boiling saturates such as pentane, hexane, and the like. Hydrocarbon mixtures such as petroleum ether can be used. In certain circumstances it may be desirable to use an aromatic such as benzene alone or in admixture with saturates as the organic solvent.

After sufficient of the charge mixture has been introduced into reaction zone 2, the flow of this charge material is interrupted. Where there are several reaction zones connected in parallel (not shown), the flow of charge material is diverted to a second reaction zone in a continuous cyclic type operation. Generally, a suitable point at which to interrupt flow of charge to reaction zone 2 is when components of the charge mixture first appear in the effluent from reaction zone 2.

Flow of the organic solvent through line 3 into reaction zone 2 is continued in order to selectively decomplex components of the charge mixture. The effluent is removed from the reaction zone by means of line 4 and lines 5, 6 and 7. The first effluent fraction is removed through lines 4 and 5; this fraction contains solvent and components of the charge mixture which form least stable molecular complexes with the polynitro aromatic compound used, e.g. picric acid. Later effluent fractions are removed through lines 4 and 6 and lines 4 and 7. These fractions contain, respectively, charge components which form molecular complexes of intermediate and greatest stability as well as organic solvent.

In addition to solvent and charge components, the effluent fractions generally contain amounts of polynitro aromatic compound which is removed from the absorbent during decomplexing of the charge components. In order to avoid loss of the polynitro aromatic, effluent fractions are extracted with a suitable solvent, e.g. water as indicated in the drawing, in extractors 8, 9 and 10. Water is a suitable solvent for water-soluble polynitro aromatics such as picric acid. Water solutions of polar organic compounds such as alcohols or ketones can be used as solvents for polynitro aromatics which have limited water solubility. The effluent fractions are then distilled in strippers 11, 12 and 13 to separate the low boiling organic solvent from the concentrates. The stripped solvent is condensed (not shown) and recycled through line 3 to reaction zone 2. Product concentrates are obtained through lines 14, 15 and 16. The product obtained through line 14 comprises a concentrate of the charge components which form least stable complexes with the polynitro aromatic compound. The line 15 product contains compounds which form intermediately stable complexes, and the line 16 product is a concentrate of the charge components which react with the polynitro aromatic compound to form the most stable complexes.

The polynitro aromatic compound which is extracted with water or aqueous polar organic solvent from the effluent fractions in extractors 8, 9 and 10 can be recovered by a second extraction in extractor 17 with a portion of the organic solvent. This recovered polynitro aromatic is recycled to reaction zone 2 through line 18. Alternatively, the polynitro aromatic could be recovered by vacuum distillation of the water. This latter procedure is not shown.

Although the drawing shows three product fractions, it will be apparent to othose skilled in the art that any number of product fractions desired can be collected. The process can be used to produce products of high purity, or the process can be used merely to concentrate components of the charge mixture to a certain point in preparation for further treatment in accordance with other treatment known in the art.

The following example illustrates the invention:

Silica gel was packed in a column and wetted with benzene. The wetted gel was then saturated with picric acid, and washed with petroleum ether. A mixture of naphthalene and biphenyl comprising by weight 50% naphthalene and 50% biphenyl was prepared. This mixture was introduced at the top of the picric acid saturated silica gel column and washed therethrough with petroleum ether. A plurality of effluent fractions were collected; petroleum ether and picric acid were removed from these fractions by water washing and distillation. The following table shows the composition of the product fractions thus obtained:

| Fraction No. | Wt. percent of charge | Percent Biphenyl | Percent Naphthalene |
| --- | --- | --- | --- |
| 1 | 0.8 | 92.2 | 7.8 |
| 2 | 7.2 | 84.6 | 15.4 |
| 3 | 15.1 | 75.9 | 24.1 |
| 4 | 9.4 | 64.2 | 35.8 |
| 5 | 16.8 | 45.6 | 54.4 |
| 6 | 12.6 | 26.1 | 73.9 |
| 7 | 16.0 | 19.6 | 80.4 |
| 8 | 12.1 | 6.7 | 93.3 |

These results show that naphthalene and biphenyl can be separated into product concentrates in accordance with the present invention. It may be noted that the naphthalene and biphenyl are decomplexed in opposite order than they are desorbed from adsorbent containing no adsorbed polynitro aromatic compound.

I claim:

1. The method of separating a charge mixture composed of aromatic hydrocarbons having different numbers of condensed rings per molecule which comprises: contacting said charge mixture with a solid adsorbent containing a previously adsorbed polynitro carbocyclic aromatic compound, thereby to form molecular complexes between charge aromatics and said adsorbed polynitro aromatic compound, contacting said complexed charge aromatics with a decomplexing solvent selected from the group consisting of charge mixture and hydrocarbons boiling substantially outside the range of said charge mixture, collecting an initial effluent fraction containing in increased concentration relative to charge mixture charge aromatics which have relatively fewer condensed rings per molecule, and collecting at least one later effluent fraction containing in increased concentration relative to preceding effluent fraction charge aromatics which have relatively more condensed rings per molecule.

2. The method according to claim 1 wherein the mixture which is separated comprises naphthalene and biphenyl.

3. The method of separating a charge mixture composed of hydrocarbons and condensed ring sulfur compounds which comprises: contacting said charge mixture with a solid adsorbent containing a previously adsorbed polynitrocarbocyclic aromatic compound, thereby to form molecular complexes between components of the charge mixture and said absorbed polynitro aromatic compound, contacting said complexed charge components with a decomplexing solvent selected from the group consisting of charge mixture and hydrocarbons boiling substantially outside the range of said charge mixture, collecting an initial effluent fraction containing charge hydrocarbons in increased concentration relative to charge mixture, and collecting at least one later effluent fraction containing condensed ring sulfur compounds in increased concentration relative to preceding effluent fraction.

4. The method of separating a charge mixture composed of naphthalene and biphenyl which comprises: contacting said charge mixture with silica gel containing previously adsorbed picric acid, thereby to form molecular complexes between charge components and the adsorbed picric acid, decomplexing the complexed charge components by contact with petroleum ether, collecting an effluent fraction containing biphenyl in increased concentration relative to charge mixture, collecting at least one later effluent fraction containing naphthalene in increased concentration relative to preceding effluent fraction, extracting picric acid from the effluent fractions with water, and separating petroleum ether from the effluent fractions by distillation.

5. The method of separating a charge mixture composed of components for which polynitro carbocyclic aromatic compounds have different molecular complex-forming affinities, said charge components being selected from the group consisting of hydrocarbons and heterocyclic sulfur compounds, which comprises: contacting a solid adsorbent with a polynitro carbocyclic aromatic compound whereby said polynitro compound is adsorbed on said adsorbent; contacting the resulting solid adsorbent containing said adsorbed polynitro compound with the charge mixture whereby molecular complexes are formed between charge components and said adsorbed polynitro compound; contacting said molecular complexes with a decomplexing solvent selected from the group consisting of charge mixture and hydrocarbons boiling substantially outside the range of said charge mixture; collecting an initial effluent fraction containing, in increased concentration relative to charge mixture, a charge component for which said polynitro compound has a relatively low complex-forming affinity; and collecting at least one later effluent fraction containing, in increased concentration relative to preceding effluent fraction, a charge component for which said polynitro compound has a relatively high complex-forming affinity.

6. Method according to claim 5 wherein said polynitro compound comprises a trinitro compound.

7. Method according to claim 5 wherein said polynitro compound is picric acid.

8. Method according to claim 5 wherein said decomplexing solvent is a hydrocarbon solvent boiling substantially below said charge mixture.

References Cited in the file of this patent
UNITED STATES PATENTS 2,716,113  Axe _____ Aug. 23, 1955

OTHER REFERENCES

Chemical Abstracts, vol. 30, page 7009[3] (1936).
Jour. Amer. Chem. Soc., vol. 61, page 1611–2 (1939).
Chemical Abstracts, vol. 35, column 6853[9] (1941).
Remick: Electronic Interpretations of Organic Chemistry, 2nd ed. (1949), John Wiley & Sons, New York, page 174.
Fieser and Fieser: Organic Chemistry, 2nd ed. (1950), Heath and Co., Boston. Pages 623–625.